United States Patent

Carraro et al.

[15] 3,686,299

[45] Aug. 22, 1972

[54] PROCESS FOR THE PREPARATION OF ACYCLIC DICARBOXYLIC ACIDS FROM DIENIC HYDROCARBONS

[72] Inventors: Giorgio Carraro, 8, Via Damiano Chiesa, Saronno (Varese); Adriano Del Vesco, 15, Via Frutta, Mantova; Santino Olindo, 94, Via Garibaldi, Venezia-Mestre, all of Italy

[73] Assignee: Montecatini Edison S.P.A., Milan, Italy

[22] Filed: Jan. 27, 1969

[21] Appl. No.: 794,418

[30] Foreign Application Priority Data

Jan. 31, 1968 Italy.....................12210 A/68

[52] U.S. Cl. ..............260/537 R, 204/80, 260/533 B
[51] Int. Cl..........................C07c 51/36, C0 7 51/52
[58] Field of Search......................260/537 R, 533 B

[56] References Cited

UNITED STATES PATENTS

| | | | |
|---|---|---|---|
| 2,749,364 | 6/1956 | Greenberg | 260/537 |
| 2,798,093 | 7/1957 | Stein | 260/537 |
| 2,816,916 | 12/1957 | Frank et al. | 260/537 |
| 2,816,918 | 12/1957 | Wynkoop et al. | 260/537 |

*Primary Examiner*—Vivian Garner
*Attorney*—Stevens, Davis, Miller & Mosher

[57] ABSTRACT

A process for the preparation of saturated dicarboxylic acids starting from dienic hydrocarbons is disclosed herein, characterized in that it is carried out in three steps, the first step of which comprises the formation of a mixture of products consisting essentially of alkali or alkaline earth metal salts of unsaturated dicarboxylic acids, through the reaction of dienic hydrocarbons, $CO_2$ and an amalgam of an alkali or alkaline earth metal, carried out in a reaction medium comprising an inert organic solvent; the second step comprising the separation of the desired acid or acids in the pure state from said reaction mixture in an otherwise conventional manner; and finaly the third step of which comprises the hydrogenation, according to per se known method of the purified unsaturated dicarboxylic acid or acids to the corresponding saturated acids. The process is especially well adapted for the production of adipic acid.

10 Claims, No Drawings

PROCESS FOR THE PREPARATION OF ACYCLIC DICARBOXYLIC ACIDS FROM DIENIC HYDROCARBONS

A number of processes for the preparation of adipic acid (starting from butadiene) are already known. These processes may be carried out either according to chemical or electro-chemical methods. Amongst the first-mentioned, a few processes involve the reaction of the butadiene with carbon monoxide and water, in the presence of bases and of catalysts constituted by cobalt compounds. Another process involves the condensation of butadiene with furfural and water to form a lactone, which is subsequently catalytically hydrogenated and then oxidized in the presence of suitable catalysts.

The electro-chemical processes, on the other hand, involve the electrolysis of butadiene-saturated solutions in organic solvents so as to obtain hexenedioic acid (dihydromuconic acid) which is then hydrogenated to adipic acid.

Both types of processes just mentioned suffer from considerable drawbacks and disadvantages. In the case of the chemical processes, when starting from carbon monoxide, water and butadiene, it becomes necessary to operate at a high temperature and under high pressures in order to attain industrially acceptable yields with respect to the butadiene; on the other hand, the synthesis from butadiene and furfural is very complex and the ultimate yields are rather low.

The electro-chemical process, besides the low specific productivity that is typical of this kind of process, suffers from the drawback of a considerable waste of energy, by reason of a voltage drop which, in addition, involves also considerable difficulties connected with heat transfer. Finally, it is indispensable to operate in the presence of a proton-donor substance to the extent required by the stoichiometry of the reaction. The presence of such substances leads to secondary reactions which contribute to lower the yield of hexenedioic acid.

Thus, the object of the present invention is to provide a process for the preparation of acyclic dicarboxylic acids, starting from dienic hydrocarbons, and from butadiene in particular, according to a method which is free of the disadvantages and drawbacks connected with the processes mentioned above.

This and still other objects are attained by the process according to the present invention, on the basis of which acyclic dicarboxylic acids are prepared starting from dienic hydrocarbons, $CO_2$ and an amalgam of an alkali or alkaline earth metal, according to a multistep process. The process of the present invention is especially well adapted for the production of adipic acid.

The first step of the process according to the present invention, comprises the formation of a mixture essentially constituted by the alkali or alkaline earth metal salts of unsaturated dicarboxylic acids through the reaction of the above-indicated reactants, operating in a medium comprising an inert organic solvent.

The second step of the process comprises the separation of the desired unsaturated acid or acids in the pure state from the reaction mixture through successive operations themselves well known to those skilled in the art.

The third step includes, finally, the hydrogenation, according to per se known methods, of the purified unsaturated dicarboxylic acid, thereby obtaining the corresponding saturated dicarboxylic acid.

More particularly, according to this invention, in the case of the preparation of adipic acid, a solution of butadiene in an anhydrous organic solvent, and preferably in the presence of special substances having the function of promoters, is admixed with $CO_2$ and contacted with the amalgam of alkali or alkaline earth metal. A turbid reaction mass is thereby obtained which chiefly contains, as a conversion product of the butadiene, the alkali or alkaline earth metal salt of the hexenedioic acid, which latter, after separation from the reaction mass, is transformed by acidification into hexenedioic acid according to the usual techniques per se well known to those skilled in the art.

The thus-obtained hexenedioic acid is thereupon purified by repeated extractions with a volatile organic solvent and subsequently by crystallization from water of the evaporated extracts.

Finally, the pure hexenedioic acid thus obtained is converted into adipic acid by hydrogenation in an aqueous solution, from which, by evaporation, the adipic acid can be readily obtained. Alternatively, the hydrogenation can be carried out directly on the hexenedioic acid salt before the acidification, purification and separation treatments. Under these conditions the formation of butadiene polymers, generally a source of marked drawbacks, is remarkably reduced or completely avoided.

The most evident advantages connected with the process according to the present invention are the following:

a. use of low-cost reactants,
b. use of simple and cheap equipment,
c. reaction conditions of a particularly mild character, which in turn allow a low energy consumption,
d. high selectivity of the reaction leading to the formation of the hexenedioic acid salt.

Although the process of the present invention is described herein with particular reference to the preparation of adipic acid from butadiene, it is to be understood that the same process is also readily applied to the preparation of other acyclic dicarboxylic acids, starting from other dienic hydrocarbons, such as pentadiene-1,3; isoprene; 2,3-dimethyl-butadiene; and the like.

The process according to the present invention, with reference to the first step, is carried out in a reaction medium comprising an inert anhydrous solvent capable of maintaining butadiene in solution.

These solvents may be selected from a wide range of compounds.

Particularly suited for the purposes of this invention are the substances resistant to the reducing action of the alkali or alkaline earth metal amalgams.

Just for purposes of exemplification the following classes of compounds may be cited: saturated hydrocarbons, substituted acyclic amides, saturated nitriles, simple or substituted lactams, sulphones, sulphoxides, ethers, phosphoric esters, organic carbonates, nitro and nitroso aliphatic and cyclo-aliphatic derivatives.

As specific examples of suitable solvents the following substances may be cited: saturated hydrocarbons such as iso-octane, n-octane, n-heptane, petroleum ether, hexane, cyclohexane, decahydronaphthalene and the like; substituted acyclic amides, such as N-dimethylformamide, N-methylacetamide, hexamethylphosphotriamide and the like; lactams such as pyrrolidone, N-methylpyrrolidone, N-cyclo-hexylpyrrolidone, ethylene-bis-pyrrolidone, valerolactam, caprolactam, ethylcaprolactam and the like; nitriles such as acetonitrile, propionitrile, benzonitrile and the like; sulphones and sulphoxides such as dimethylsulphoxide, sulpholane, sulphonal, diphenylsulphoxide, diphenylsulphone and the like; ethers such as methylethylether, diethylether, methyl-n-propylether, methylisopropylether, trimethyleneglycol-dimethylether, dioxane, ethylene-glycol-monomethylether-acetate, tetrahydrofuran, and the like; organic carbonates such as diethylcarbonate, ethylenecarbonate, propylenecarbonate and the like; phosphoric esters such as: trimethylphosphate, triethylphosphate, trinormalbutylphosphate, di-methyl-normalbutyl-phosphate, methyldiethylphosphate and the like; and nitro and nitroso derivatives such as nitromethane, nitroso-dimethyl-amine and the like. All these solvents can be used either alone or in suitable mutual mixtures.

The process according to the present invention is carried out by operating in a reaction medium comprising inert anhydrous organic solvent of the above-described type and preferably also particular promoters constituted by salts of cations containing organic groups or by lithium salts such as lithium chloride. Said promoters are used in quantities varying within a wide range. Good results are obtained with said promoters in amounts higher than 0.001 parts by weight per 100 parts by weight of solvent. The upper limit depends on the nature of the promoter itself and it is generally fixed by the solubility of the promoter itself in the reaction medium.

Particularly suited for this purpose proved to be onium salts of the type:

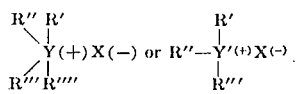

wherein:
Y is nitrogen or phosphorous and
Y' is oxygen or sulphur
R', R", R''' and R'''', which may be the same or different from each other, may be alkyl, aryl, alkylaryl, arylalkyl, cycloalkyl or alkylene radicals containing one or more hetero-atoms, such as nitrogen, oxygen and sulphur;
X is a halogen (fluorine, chlorine, bromine and iodine) or an SO$_4$ group or an anion of an organic sulphonic acid such as

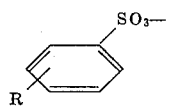

where R is an alkyl radical containing from one to 18 carbon atoms, the anion of a carboxylic acid, CNS$^-$, CNO$^-$ and the like.

Just for purposes of exemplification the following compounds can be cited: tetramethylammonium p-toluenesulphonate, methyltributylammonium p-toluenesulphonate, triethylmethylammonium p-toluenesulphonate, tetramethylammonium bromide, trimethylcetylammonium bromide, trimethylcyclopentylammonium bromide, trimethylethylammonium chloride, di-stearyldimethylammonium chloride, trimethyl(2-propyl-1-phenyl)ammonium iodide:

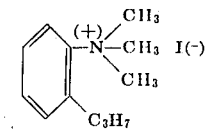

N,N'-dimethyltriethylenediammonium iodide:

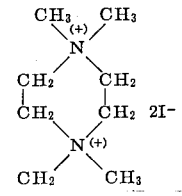

N,N'-dimethyltriethylenediammonium iodide:

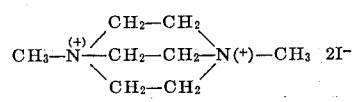

trimethyl-(p-tolyl)ammonium iodide, N-dimethylmorpholine iodide, alpha or beta-naphthalenesulphonate of tetramethylammonium, benzyltriethylammonium phosphate, benzyl-trimethylammonium thiocyanate, N-methyl-N-ethylpiperidine iodide, tetrabutylammonium fluoride, trimethylcyclohexylammonium acetate, tetramethylphosphonium iodide, and the like.

The process according to the present invention is carried out at temperatures varying from −40° C. to +200° C. Particularly satisfactory results are attained by operating at temperatures varying from −5° C. to +100° C.

The process is carried out by maintaining the gaseous reactants under partial pressures varying from 0.01 to 100 atm.

It is preferred to operate with butadiene or other hydrocarbons under partial pressures varying from 0.01 to 50 atm. and with the CO$_2$ at partial pressures varying over a wide range, depending on the operational conditions, and if desired, in the presence of an inert gas.

The process according to this invention is carried out by using an amalgam of an alkali metal or an alkaline earth metal, such as for instance, sodium, potassium, rubidium, cesium, lithium, calcium, strontium and barium. The concentration of the amalgam in active metal may vary over wide ranges. Particularly favorable results are obtained with concentrations in alkali metal or alkaline earth metal varying from 0.01 to 1 percent, but preferably from 0.05 to 0.5 percent parts by weight.

According to a preferred embodiment of this invention, the solution of the promoter in an inert anhydrous organic solvent, of the type previously described, is first admixed with the butadiene and the mixture then saturated with $CO_2$. To the resulting solution is then rapidly admixed, with stirring, the amalgam of the alkali or alkaline earth metal. The stirring is continued while maintaining constant the pressure of the $CO_2$ up to the complete exhaustion of the amalgam.

The exhausted amalgam is then discharged from the reaction vessel and the reaction mass is centrifuged and then repeatedly washed with $CHCl_3$.

The residue is dried and dissolved in the minimum quantity of concentrated HCl and subsequently, and repeatedly, extracted with ethyl ether. The etheric extracts, combined and then evaporated, are subjected to hydrogenation, whereupon a mixture of acids containing a high percentage of the desired adipic acid is obtained.

Alternatively, after the treatments with $CHCl_3$ the residue is dried and dissolved in the minimum amount of water, then hydrogenated, and thereafter repeatedly extracted with ethyl ether. The etheric extracts combined, acidified with concentrated HCl evaporated, and subsequently dried, give rise to a mixture of acids containing a high percentage of the desired adipic acid.

Other characteristics and advantages connected with the present invention will be further evidenced by the following detailed working examples which are given merely for illustrative and not limiting purposes:

EXAMPLE 1

Into a three-necked 250 cc flask, provided with a stirrer, an inlet tube for the $CO_2$, a tube for the introduction of the amalgam and one discharging tube on the bottom, 100 g of a solution of tetraethylammoniumparatoluenesulphonate (3 percent by weight) in N-methyl-pyrrolidone were introduced. This solution was then saturated at 25° C with butadiene-1,3 (14.6 percent by weight).

This solution, kept stirred, was saturated at room temperature and pressure with $CO_2$. 2 kg of sodium amalgam (0.1 percent by weight of sodium) were then rapidly mixed in with this solution.

With continuous stirring, $CO_2$ was introduced so as to maintain the pressure at a value corresponding to the atmospheric pressure up to complete exhaustion of the amalgam.

Thereupon the exhausted amalgam was discharged from the flask. The slurry was centrifuged and repeatedly washed with $CHCl_3$. The residue was then dried and dissolved in the minimum quantity of concentrated HCl and then extracted three times with ethyl ether.

The etheric extracts were combined and evaporated to yield 1.75 g of $\beta,\gamma$-dihydromuconic acid (evidenced by the infrared and NMR spectrum of the hydrogenation product), which by hydrogenation yielded 1.775 g of adipic acid.

EXAMPLES 2–6

In Table I below are reported the results of Examples 2–6.

The dienic hydrocarbon used in all cases was butadiene-1,3.

The procedure followed was the same as that described above in detail for Example 1, except as noted.

In Example 5, instead of performing first the saturation of the solvent with the butadiene, this latter, in equimolar mixture with $CO_2$, was continuously bubbled at a rate of 5 liters per hour through the solvent (dimethylformamide) to which the quaternary ammonium salt (p.toluene-sulphonate of tetraethylammonium) had been added.

In Example 6 an amalgam of lithium at 0.035 percent was used.

The alkali metal salts obtained by the treatment of the reaction slurry, according to what is described in Example 1, were dissolved in the minimum quantity of concentrated HCl and continuously extracted with ethyl ether and subsequently hydrogenated. The acidified hydrogenation products led to a mixture containing adipic acid in large amounts.

In order to determine the selectivity of the reaction, with respect to the formation of the adipic acid, the following procedure was followed:

a. The total degree of unsaturation of the reaction mixture was determined by hydrogenating an aqueous solution of a fraction of the etheric extract, neutralized with aqueous NaOH. In this way the total amount of reacted butadiene was determined, keeping in mind that for each mole of reacted hydrocarbon 2 grams (1 mole) of hydrogen are consumed.

b. The quantity of adipic acid formed was determined by first hydrogenating in an etheric solution another identical fraction of the etheric extract of the reaction mixture. For this purpose metal palladium supported on carbon was used as hydrogenation catalyst.

The hydrogenation product was then esterified with diazomethane and then submitted to a gas-chromatographic analysis (in the presence of a reference standard —cyclohexanone— in a Carbowax column, 20 M, at 10 percent on sylanized Chromosorf) at a programmed temperature of from 100° to 180° C. Once the quantity of adipic acid present was determined, it was quite easy to determine, by a simple calculation, the quantity of hydrogen theoretically usable for the hydrogenation of only the $\beta$, $\gamma$-hexendioic acid (which is the unsaturated acid corresponding to the adipic acid).

Let $Q_1$ be the quantity of hydrogen used for the total hydrogenation and $Q_2$ be the quantity of hydrogen usable only for the saturation of the $\beta$, $\gamma$-hexendioic acid, then the selectivity of the reaction, according to the present invention, with respect to the formation of the desired adipic acid, is given by the simple relation: $(Q_2/Q_1) \times 100$ The yield in adipic acid with respect to the alkali or alkaline earth metal of the amalgam is easily determined by relating the equivalents of the found adipic acid to the equivalents of the used alkali or alkaline earth metal.

TABLE I

| Example | 2 | 3 | 4 | 5 | 6 |
|---|---|---|---|---|---|
| Type of solvent: | NMP | DMSO | DMF | DMF | NMP |
| Temp. in °C | 20° | 20° | 50° | 20° | 20° |
| Total pressure in ate. | 1 | 1 | 1 | 1 | 1 |
| Butadiene % by weight in the solution | 16.2 | 6.3(1) | | 6.2 | 15.2 |
| Type of promotor | TEATS | TEATS | TEATS | TEATS | TEATS |
| % by weight of promotor in the solvent | 2.5 | 3 | 0.5 | 1 | 0.94 |
| Type of amalgam | Na—Hg | Na—Hg | Na—Hg | Na—Hg | Li—Hg |
| % by weight of metal in the amalgam | 0.14 | 0.14 | 0.14 | 0.14 | 0.035 |
| % yield (by weight) in adipic acid with respect to the reacted butadiene | 49 | 62 | 70 | 80 | 40 |
| % yield (by weight) in adipic acid with respect to the reacted alkali metal | 25 | 30 | 29 | 35 | 20 |

(1) Continuous flow of an equimolecular mixture of butadiene and $CO_2$ at the rate of 5 normal liters per hour.
NMP = N-methylpyrrolidone
TEATS = tetraethylammoniumtoluene sulphonate
DMSO = dimethylsulphoxide
DMF = dimethylformamide

EXAMPLE 7

Into a 800 cc glass autoclave, equipped with an anchor stirrer, 166 g of a solution of TEATS (4 percent by weight) in propylenecarbonate, and, thereafter, 2040 g of sodium amalgam (0.11 percent by weight of sodium) were charged. After having created a vacuum, 22 g of butadiene were also introduced into the autoclave.

The thus-obtained solution was then heated at 40° C; $CO_2$ was then introduced at a partial pressure of 1 atm, while the reaction mass was kept stirred with the stirrer working at 650 r.p.m.

During the reaction, the $CO_2$ pressure was kept constant by continuously replacing the reacted $CO_2$.

The exhaustion of the amalgam, revealed by the stopping of the absorption of $CO_2$, was completed within 30 minutes.

The slurry discharged from the autoclave and treated as described above in Example 1 gave rise to a salt which, when analyzed according to the procedure described in the preceding examples, indicated a yield in adipic acid equal to 68 percent with respect to sodium and 81 percent with respect to the converted butadiene.

EXAMPLES 8–18

Example 7 was repeated using different amounts and type of reactants and following different reaction conditions. The type, the amounts of the reactants, the reaction conditions and the results thereof are reported in Table II:

TABLE II

| Example | 8 | 9 | 10 | 11 | 12 | 13 | 14 | 15 | 16 | 17 | 18 |
|---|---|---|---|---|---|---|---|---|---|---|---|
| Type of solvent | PC | PC | PC | PC | PC | PC | PC | PC | PC | PC | PC |
| Temperature, in °C | 40 | 40 | 40 | 40 | 75 | 50 | 55 | 50 | 20 | 40 | 40 |
| Partial pressure of $CO_2$, in ate | 2 | 4 | 6 | 11 | 4 | 6 | 4 | 4 | 0.5 | 0.5 | 0.5 |
| Butadiene, percent by weight in the solution | 12 | 12 | 15 | 12 | 12 | 12 | 12 | 12 | 5 | | 6 |
| Type of promoter | TEATS | TEATS | TEATS | TEATS | TEATS | TEATS | TEATS | TEATS | TEATS | Et₄NCl | Et₄NBr |
| Percent by weight of promoter in the solvent | 4 | 4 | 4 | 4 | 4 | 8 | 2 | 17 | 2 | 1 | 1 |
| Type of amalgam | Na | Na | Na | Na | Na | Na | Na | Na | Na | Na | Na |
| Percent by weight of metal in the amalgam | 0.13 | 0.13 | 0.13 | 0.13 | 0.13 | 0.13 | 0.13 | 0.13 | 0.13 | 0.13 | 0.13 |
| Percent yield (by weight in in adipic acid with respect to the reacted butadiene | 81 | 81 | 82 | 83 | 82 | 82 | 84 | 85 | 72 | 60 | 62 |
| Percent yield (by weight) in adipic acid with respect to the reacted alkaline metal | 68 | 65 | 59 | 24 | 77 | 68 | 60 | 57 | 54 | 27 | 25 |

NOTE.—PC=propylene carbonate. Et₄NCl=tetraethylammonium chloride. TEATS=tetramethylammonium toluene sulphonate. Et₄NBr=tetraethylammonium bromide.

What is claimed is:

1. A process for the preparation of saturated dicarboxylic acids from conjugated dienic hydrocarbons selected from the group consisting of 1,3-butadiene, 2,3-dimethyl-butadiene, isoprene and 1,3-pentadiene comprising the formation of a mixture of products consisting essentially of alkali or alkaline earth metal salts of unsaturated dicarboxylic acids, by the reaction of conjugated dienic hydrocarbons. $CO_2$ and an amalgam of an alkali or alkaline earth metal, in a reaction medium comprising an inert anhydrous organic solvent selected from the group consisting of iso-octane, n-octane, n-heptane, petroleum ether, hexane, cyclohexane, decahydronaphthalene, N-dimethylformamide, N-methylacetamide, hexamethylphosphotriamide, pyrrolidone, N-methylpyrrolidone, N-cyclohexylpyrrolidone, ethylene-bis-pyrrolidone, valerolactam, caprolactam, ethylcaprolactam, acetonitrile, propionitrile, benzonitrile, dimethylsulphoxide, sulpholane, sulphonal, diphenylsulphoxide, diphenylsulphone, methylethylether, diethylether, methyl-n-propylether, methylisopropylether, trimethyleneglycol-dimethylether, dioxane, ethylene-glycol-monoethylether-acetate, tetrahydrofuran, diethylcarbonate, ethylenecarbonate, propylenecarbonate, trimethylphosphate, triethylphosphate, trinormalbutylphosphate, dimethyl-normalbutylphosphate, methyl-diethylphosphate, nitromethane, and nitrosodimethylamine at a temperature of from −40°C to +200° C and maintaining the gaseous reaction components under partial pressures varying from 0.01 to 100 atm.

separating the corresponding unsaturated acid or acids in the pure state from said reaction mixture; and hydrogenating the purified unsaturated dicarboxylic acid or acids to the corresponding desired saturated acids.

2. A process according to claim 1, wherein the promoter is used in quantities higher than 0.001 parts by weight per 100 parts by weight of solvent, the upper limit being fixed by the solubility of said promoter in said solvent.

3. A process according to claim 1, wherein the temperature varies from −5° C to +100° C.

4. A process according to claim 1, wherein the pressure varies from 0.01 to 50 atm.

5. A process according to claim 1 wherein the reaction medium comprises said inert anhydrous organic solvent and a promoter selected from the group consisting of lithium chloride, tetramethylammonium p-toluenesulphonate, methyltributylammonium p-toluenesulphonate, triethylmethylammonium p-toluenesulphonate, tetramethylammonium bromide, trimethylcetylammonium bromide, trimethylcyclopentylammonium bromide, trimethylethylammonium chloride, di-stearyldimethylammonium chloride, trimethyl(2-propyl-1-phenyl)ammonium iodide, N,N,N',N'-tetramethylpiperazine iodide, N,N'-dimethyltriethylenediammonium iodide, trimethyl-(p-tolyl) ammonium iodide, N-dimethylmorpholine iodide, alpha-naphthalene sulphonate of tetramethylammonium, beta-naphthalene sulphonate of tetramethylammonium, benzyltriethylammonium phosphate, benzyltrimethylammonium triocyanate, N-methyl-N-ethylpiperidine iodide, tetrabutylammonium fluoride, trimethylcyclohexyammonium acetate and tetramethylphosphonium iodide.

6. A process for the preparation of adipic acid starting from butadiene, comprising the formation of a mixture of products, consisting essentially of alkali or alkaline earth metal salts of hexenedioic acid, by reaction of butadiene-1,3, $CO_2$ and an amalgam of an alkali or alkaline earth metal, in a reaction medium comprising an inert anhydrous organic solvent selected from the group consisting of iso-octane, n-octane, n-heptane, petroleum ether, hexane, cyclohexane, decahydronaphthalene, N-dimethylformamide, N-methylacetamide, hexamethylphosphotriamide, pyrrolidone, N-methylpyrrolidone, N-cyclohexylpyrrolidone, ethylene-bis-pyrrolidone, valerolactam, caprolactam, ethylcaprolactam, acetonitrile, propionitrile, benzonitrile, dimethylsulphoxide, sulpholane, sulphonal, diphenylsulphoxide, diphenylsulphone, methylethylether, diethylether, methyl-n-propylether, methylisopropylether, trimethyleneglycoldimethylether, dioxane, ethylene-glycol-monoethylether-acetate, tetrahydrofuran, diethylcarbonate, ethylenecarbonate, propylenecarbonate, trimethylphosphate, triethylphosphate, trinormalbutylphosphate, dimethyl-normalbutylphosphate, methyldiethylphosphate, nitromethane, and nitrosodimethylamine at a temperature of from − 40°C to +200°C and maintaining the gaseous reaction components under partial pressures varying from 0.01 to 100 atm.; separating the hexenedioic acid in the pure state from said reaction mixture; and hydrogenating the purified hexenedioic acid to adipic acid.

7. A process according to claim 6, wherein the temperature varies from −5° C to + 100° C.

8. A process according to claim 6, wherein the pressure varies from 0.01 to 50 atm.

9. A process according to claim 6 wherein the reaction medium comprises said inert anhydrous organic solvent and a promoter selected from the group consisting of lithium chloride, tetramethylammonium p-toluenesulphonate, methyltributylammonium p-toluenesulphonate, triethylmethylammonium p-toluenesulphonate, tetramethylammonium bromide, trimethyl-cetylammonium bromide, trimethylcyclopentylammonium bromide, trimethylethylammonium chloride, di-stearyldimethylammonium chloride, trimethyl(2-propyl-1-phenyl)ammonium iodide, N,N,N',N'-tetramethylpiperazine iodide, N,N'-dimethyltriethylenediammonium iodide, trimethyl-(p-tolyl) ammonium iodide, N-dimethylmorpholine iodide, alpha-naphthalene sulphonate of tetramethylammonium, beta-naphthalene sulphonate of tetramethylammonium, benzyltriethylammonium phosphate, benzyltrimethylammonium thiocyanate, N-methyl-N-ethylpiperidine iodide, tetrabutylammonium fluoride, trimethylcyclohexyammonium acetate and tetramethylphosphonium iodide.

10. A process according to claim 9, wherein the promoter is used in quantities varying higher than 0.001 parts by weight per 100 parts by weight of solvent, the upper limit being fixed by the solubility of said promoter in said solvent.

* * * * *